US010100693B2

(12) United States Patent
Ryu et al.

(10) Patent No.: US 10,100,693 B2
(45) Date of Patent: Oct. 16, 2018

(54) UREA SOLUTION PUMP UNIT

(71) Applicants: HYUNDAI MOTOR COMPANY, Seoul (KR); Hyundam Industrial Co., Ltd., Asan-si, Chungcheongnam-do (KR)

(72) Inventors: Bu Yeol Ryu, Hwaseong-si (KR); Pil Seon Choi, Anyang-si (KR); Chan Yo Jeon, Daejeon (KR); Bu Hyeon Cho, Asan-si (KR); Yong Taek Hwang, Asan-si (KR)

(73) Assignees: HYUNDAI MOTOR COMPANY, Seoul (KR); HYUNDAM INDUSTRIAL CO., LTD., Asan-si, Chungcheongham-do (KR)

( * ) Notice: Subject to any disclaimer, the term of this patent is extended or adjusted under 35 U.S.C. 154(b) by 450 days.

(21) Appl. No.: 14/857,427

(22) Filed: Sep. 17, 2015

(65) Prior Publication Data

US 2016/0265406 A1    Sep. 15, 2016

(30) Foreign Application Priority Data

Mar. 9, 2015    (KR) .................... 10-2015-0032757

(51) Int. Cl.
  *F01N 3/20*  (2006.01)
  *F04D 13/06*  (2006.01)
  *F04D 29/58*  (2006.01)

(52) U.S. Cl.
  CPC ........... *F01N 3/2066* (2013.01); *F04D 13/06* (2013.01); *F01N 2610/02* (2013.01);
  (Continued)

(58) Field of Classification Search
  CPC ....... F01N 2610/1433; F01N 2610/144; F04D 13/06; F04D 1629/5883; F04D 13/02; F04D 13/005
  (Continued)

(56) References Cited

U.S. PATENT DOCUMENTS

2012/0020820 A1*    1/2012    Francini ................. F04C 2/102
                                                                 417/410.4
2013/0000743 A1*    1/2013    Crary ................... F01N 3/2066
                                                                 137/15.04

FOREIGN PATENT DOCUMENTS

DE    102004062603 B3    7/2006
DE    102013112474 A1    12/2014
(Continued)

OTHER PUBLICATIONS

Extended European Search Report dated Oct. 6, 2016 issued in European Patent Application No. 15189982.0.

*Primary Examiner* — Kenneth J Hansen
(74) *Attorney, Agent, or Firm* — McDermott Will & Emery LLP

(57) ABSTRACT

A urea solution pump unit includes a bracket mounted to a lower side of a urea solution tank. A pump unit is horizontally disposed at a center of an upper part of the bracket and includes a pump suctioning a urea solution to one direction and a motor pumping the urea solution to another direction through a gap between a rotor and a stator of the motor inside the pump and discharging the urea solution to a lower side of the bracket. A pair of thawing units are fixedly disposed at both sides of the pump unit on the bracket. The thawing units transfer heat to the urea solution and prevent the urea solution from being frozen. A sensor unit is disposed at one side of one of the thawing units and detects a level, a temperature, and a pressure of the urea solution.

16 Claims, 13 Drawing Sheets

(52) U.S. Cl.
CPC .............................. *F01N 2610/148* (2013.01); *F01N 2610/1433* (2013.01); *F04D 29/588* (2013.01); *Y02T 10/24* (2013.01)

(58) Field of Classification Search
USPC ........... 60/286, 295, 297, 301, 303; 137/341
See application file for complete search history.

(56) References Cited

FOREIGN PATENT DOCUMENTS

| | | |
|---|---|---|
| EP | 2556870 A2 | 2/2013 |
| EP | 2837785 A1 | 2/2015 |
| KR | 10-1459476 B1 | 11/2014 |
| KR | 10-1459680 B1 | 11/2014 |
| KR | 10-1490931 B1 | 2/2015 |

* cited by examiner

UREA SOLUTION PUMP UNIT

CROSS-REFERENCE TO RELATED APPLICATION

This application claims the benefit of priority to Korean Patent Application No. 10-2015-0032757 filed in the Korean Intellectual Property Office on Mar. 9, 2015, the entire content of which is incorporated herein by reference.

TECHNICAL FIELD

The present disclosure relates to a urea solution pump unit which is disposed at a lower part of a urea solution tank, and sucks a urea solution and pumps the urea solution to outside to decrease harmful substances included in exhaust gas of an engine.

BACKGROUND

An environmentally-friendly vehicle has been developed globally, and vehicle emission standards for each country are being gradually reinforced. Further, vehicle makers have developed an environmentally-friendly diesel vehicle due to the regulation of carbon dioxide.

The exhaust gas emission of the diesel vehicle includes nitrogen oxides and particulate matter, and among them, a nitrogen oxide decreasing technique focuses to a lean NOx trap (LNT) and urea-selective catalytic reduction (urea-SCR). Particularly, the urea-SCR is useful to decrease nitrogen oxides discharged from a diesel engine of a large vehicle.

The urea-SCR is a selective reduction system which injects a harmless urea solution to an exhaust system, converts the injected urea solution into ammonia through pyrolysis, and causes the converted ammonia to react with a nitrogen oxide to convert the converted ammonia into a harmless component, such as water and nitrogen, and requires a storage system separately storing the urea solution.

The urea solution storage system includes a urea solution tank, a pump, an inlet, a pipe, a wire, and various kinds of sensors, and particularly, the pump requires a structure stably pumping a strong alkaline urea solution and a decrease in a vertical length of the urea solution tank.

A research to decrease a problem by improving a sealing structure of a power supply system, improving durability by preventing a rotor and a stator from being corroded due to a urea solution, effectively preventing a urea solution from being frozen, improving mounting stability of the sensors, and preventing impact according to a pressure increase when pumping a urea solution has been conducted.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a urea solution pump unit which is capable of generally improving operation stability, durability, and a sealing property of the pump unit by improving a sealing structure, preventing a stator and a rotor from being corroded, and effectively preventing a urea solution from being frozen.

An exemplary embodiment of the present inventive concept, a urea solution pump unit includes a bracket mounted to a lower side of a urea solution tank. A pump unit is horizontally disposed at a center of an upper part of the bracket and includes a pump suctioning a urea solution to one direction and a motor pumping a urea solution to another direction through a gap between a rotor and a stator of a motor inside the pump and discharging the urea solution to a lower side of the bracket. A pair of thawing units are fixedly disposed at both sides of the pump unit on the bracket. The pair of thawing units transfer heat to a urea solution and prevent the urea solution from being frozen. A sensor unit is disposed at one side of one of the thawing units and detects a level, a temperature, and a pressure of the urea solution.

The stator may include an exterior stator over-molding surrounding an outer peripheral surface of the stator, and an interior stator over-molding surrounding an inner peripheral surface of the stator.

The rotor may include an exterior rotor over-molding surrounding an outer side of the rotor.

The motor may include a rotating shaft rotating together with the rotor, in which the urea solution is suctioned through one end of the rotating shaft and is discharged through another end of the rotating shaft. The pump unit may include: an upper cover disposed at the other end of the rotating shaft, having an outlet at a center thereof corresponding to the rotating shaft, and having a three-phase terminal which supplies power to the stator and is disposed at an external side of the outlet; an outlet adaptor integrally extending from the upper cover to an opposite side of the rotor, and fastened to an upper surface of the bracket to transfer the urea solution to a lower side of the bracket; and a relief valve fastened to the outlet adaptor and maintaining the urea solution at a predetermined pressure or lower.

When the relief valve is connected with the outlet and a pressure equal to or larger than the predetermined pressure is detected, the relief valve may autonomously open and relieve the pressure to an upper side of the bracket.

The three-phase terminal may extend to a lower side of the outlet adaptor and be connected to the outside through the bracket.

The urea solution pump unit may further include a first adaptor o-ring disposed around the three-phase terminal, which extends to lower sides of the outlet and the outlet adaptor, to seal the outlet and the outlet adaptor from the urea solution, in which the outlet extends at a lower side of the outlet adaptor.

A pipe-shaped metal port may be inserted into an internal peripheral surface of the outlet corresponding to the outlet adaptor, and one or more port o-rings that are sealing members may be disposed on an outer peripheral surface of the metal port.

A discharge pipe discharging a urea solution received from the outlet adaptor may integrally extend at the lower side of the bracket, a pipe-shaped metal port may be inserted in an internal peripheral surface of the outlet, and one or more port o-rings that are sealing members may be disposed on an outer peripheral surface of the metal port.

An adaptor insertion recess, into which the outlet adaptor is inserted, may be formed on the bracket, and the urea solution pump unit may include a clip that may fix the outlet adaptor to the adaptor insertion recess so that the outlet adaptor is inserted into the adaptor insertion recess.

The urea solution pump unit may further include a second adaptor o-ring disposed between a lower surface of the outlet adaptor and a bottom surface of the adaptor insertion recess to seal the urea solution.

Hooks may be integrally formed on the bracket, and hook fastening parts fastened to the hooks may be integrally formed at a lower side of each thawing unit.

The sensor unit may include: a sensor flange extending to the upper side of the bracket; and a sensor cell mounted on the bracket at a lower end of the sensor flange. The sensor cell may be surrounded by a resin material and sealed from the urea solution to be fixed to the bracket, and may be electrically connected to a lower external side of the bracket.

The thawing unit may include: a positive temperature coefficient (PTC) transistor configured to generate heat by electric energy; a PTC guide having a recess, into which the PTC is mounted; power supply terminals attached to both surfaces of the PTC guide and being in contact with the PTC; an adhesive film attached to an external surface of each power supply terminal; and a thawing over-molding surrounding external sides of the PTC, the PTC guide, and the adhesive film to protect the PTC, the PTC guide, and the adhesive film from the urea solution.

The relief valve may include a check ball and an elastic member elastically supporting the check ball.

The urea solution pump unit may further include: a heater connector connecting a power supply to the thawing units; a pressure sensor connector connecting the power supply to the sensor unit; a motor connector connecting the power supply to the motor; a level/temperature sensor connector connecting the power supply to the sensor unit; and a collective connector mounted at the lower side of the bracket and connected to each of the heater connector, the pressure sensor connector, the motor connector, and the level/temperature sensor connector at one side thereof.

DETAILED DESCRIPTION OF THE EMBODIMENTS

An exemplary embodiment of the present invention will hereinafter be described in detail with reference to the accompanying drawings.

Figure 1:
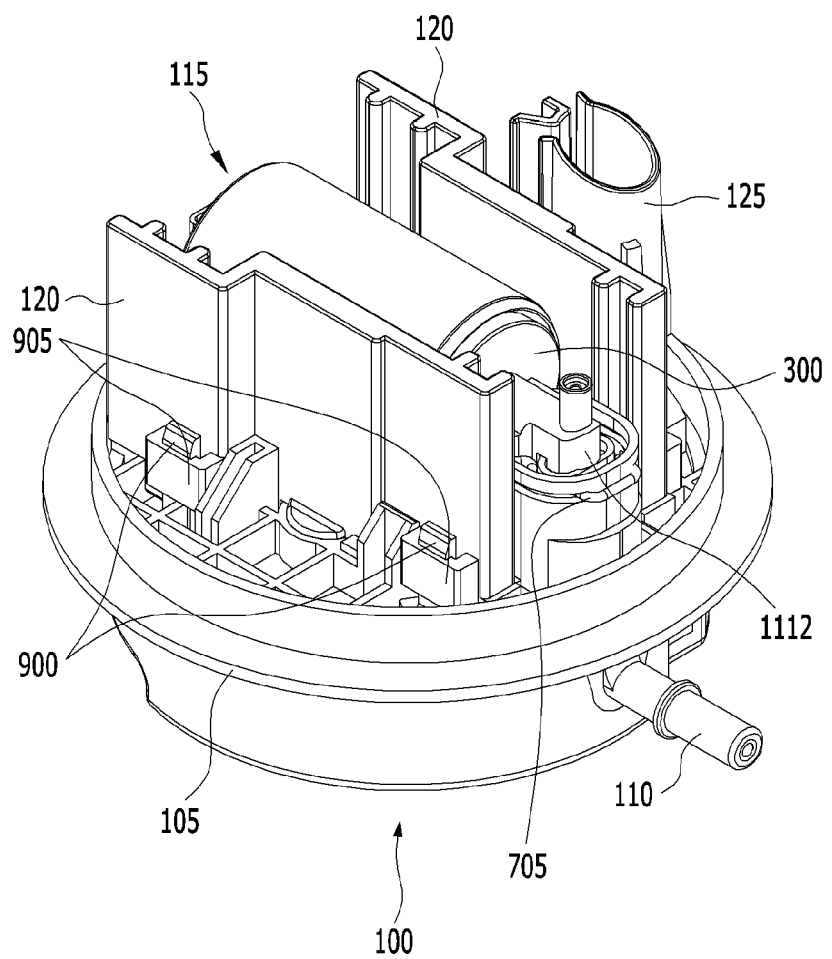
FIG. 1 is a partial perspective view illustrating a urea solution pumping system according to an exemplary embodiment of the present inventive concept

FIG. 1 is a partial perspective view illustrating a urea solution pumping system according to an exemplary embodiment of the present inventive concept.

Referring to FIG. 1, a urea solution pumping system 100 includes a bracket 105, a clip 705, a discharge pipe 110, an outlet adaptor 1112, an upper cover 300, a sensor flange 125, a thawing unit 120, a pump unit 115, a hook fastening part 905, and a hook 900.

The bracket 105 has a structure mounted at an opened hole formed at a lower part of a urea solution tank, and the pump unit 115 pumping a urea solution is disposed on the bracket 105.

The thawing unit 120 thawing the urea solution is disposed at both sides of the pump unit 115, and is fastened onto the bracket 105 through the hook 900 and the hook fastening part 905.

The sensor flange 125 for a level sensor and a pressure sensor may be integrally formed with the bracket 105 at one side of the thawing unit 120, and the temperature sensor may be disposed in the bracket 105 in correspondence with an inlet side of the pump unit 115 to improve temperature detecting performance.

The outlet adaptor 1112, which sucks the urea solution at a rear side of the pump unit 115, has the upper cover 300 disposed at a front side thereof, and discharges the urea solution to a front side of the upper cover 300, is integrally formed.

The outlet adaptor 1112 is fastened to the upper bracket 105 through the clip 705, and the urea solution pumped by a pump of the pump unit 115 is pumped to a urea solution injector (not illustrated) through the upper cover 300, the outlet adaptor 1112, and the discharge pipe 110.

The thawing unit 120 prevents the urea solution filled in a urea solution tank from being frozen, and is firmly fixed through a fastening structure of the hook 900 formed on the bracket 105 and the hook fastening part 905 formed at a lower side of the thawing unit 120.

Further, the thawing unit 120 is disposed at both sides of the pump unit 115 to make the thawed urea solution be rapidly supplied to a suction side of the pump unit 115.

Figure 2:
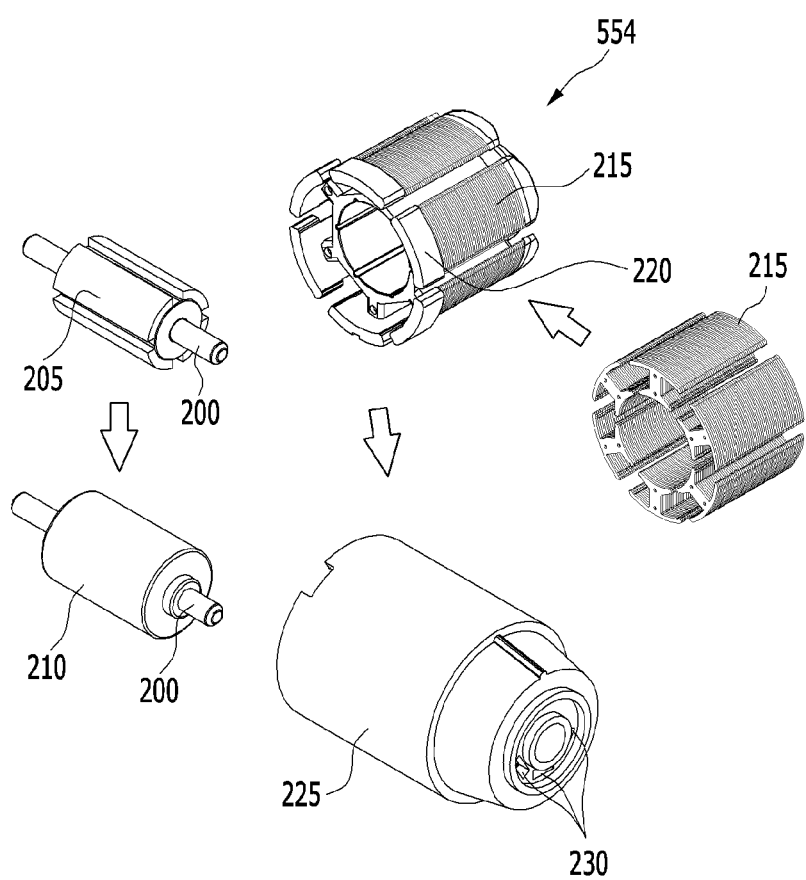
FIG. 2 is a partial exploded perspective view of a motor of the urea solution pumping system according to the exemplary embodiment of the present inventive concept.

FIG. 2 is a partial exploded perspective view of a motor of the urea solution pumping system according to the exemplary embodiment of the present inventive concept.

Referring to FIG. 2, the pump unit 115 includes a motor 554, and the motor 554 includes a rotating shaft 200, a rotor 205, a rotor over-molding 210, a stator 215, an interior stator over-molding 220, an exterior stator over-molding 225, and terminal holes 230.

The rotor over-molding 210 surrounds the rotor 205 to prevent the urea solution from permeating, and the interior stator over-molding 220 and the exterior stator over-molding 225 generally surround the stator 215 to prevent the urea solution from permeating.

Figure 3:
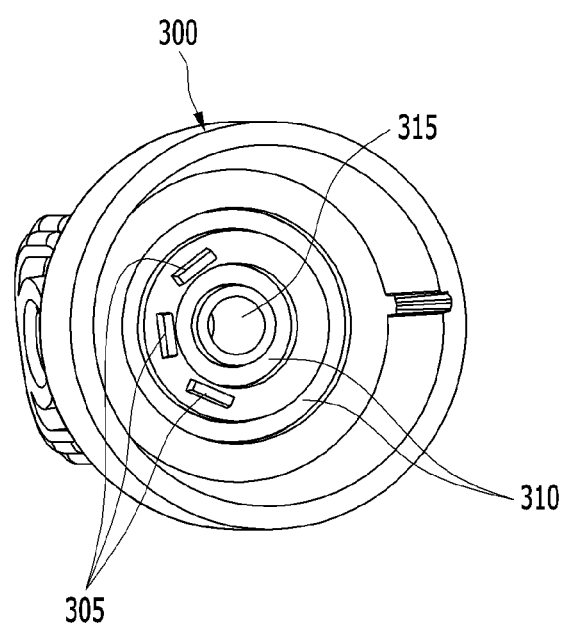
FIG. 3 is a partial perspective view of a discharge unit of the urea solution pumping system according to the exemplary embodiment of the present inventive concept.

The terminal holes 230, through which power is supplied, are formed on a front surface of the exterior stator over-molding 225, and the terminal holes 230 are formed in correspondence with a three-phase terminal 305 of FIG. 3.

The rotor over-molding 210 may be formed of a material in which an engineering plastic is mixed with a glass fiber, and similarly, the exterior stator over-molding 225 and the interior stator over-molding 220 may also be formed of a material in which the engineering plastic is mixed with the glass fiber.

FIG. 3 is a partial perspective view of a discharge unit of the urea solution pumping system according to the exemplary embodiment of the present inventive concept.

Referring to FIG. 3, the upper cover 300 is formed to cover a front surface of the exterior stator over-molding 225, and has an outlet 315 at a center thereof.

The three-phase terminal 305, through which power is supplied, protrudes and is disposed around the outlet 315, and o-ring grooves 310 are formed based on the outlet 315 at both sides based on the three-phase terminal 305.

Figure 5:
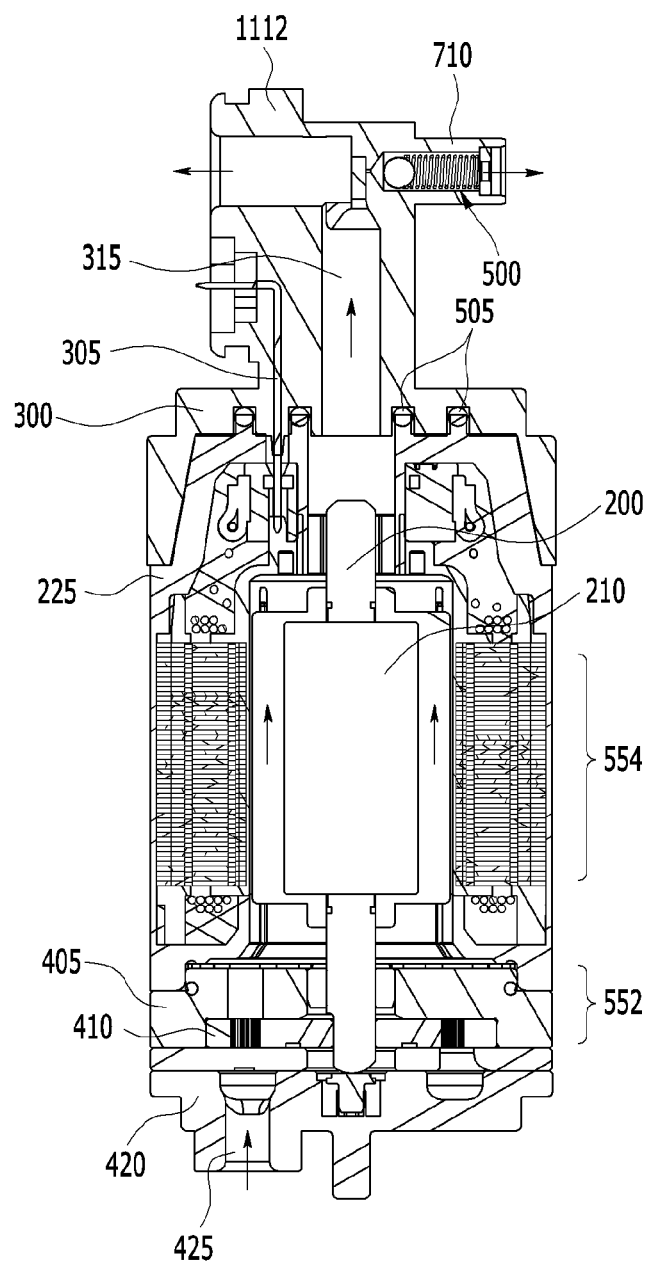
FIG. 5 is a partial cross-sectional view of the pump unit, the motor, and the discharge unit according to the exemplary embodiment of the present inventive concept.

Here, upper motor o-rings 505 of FIG. 5 are sealing members and mounted at the o-ring grooves 310 to block the urea solution flowing through the outlet 315 and an external urea solution from flowing into the three-phase terminal 305.

Figure 4:
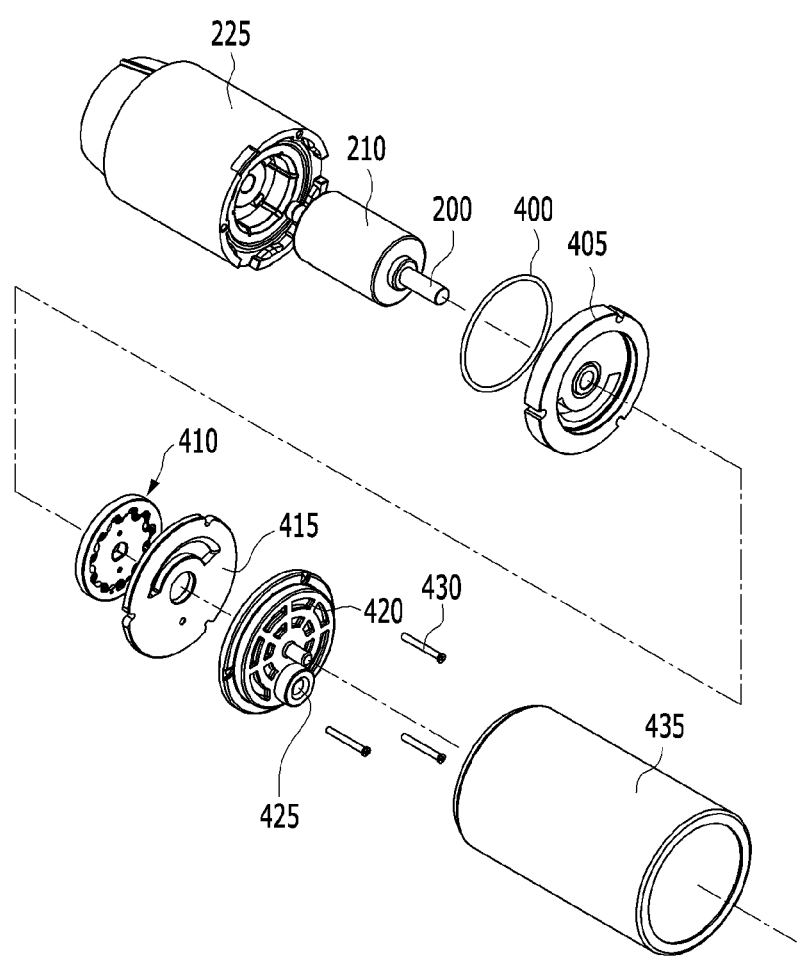
FIG. 4 is a partial exploded perspective view of the motor and a pump unit in the urea solution pumping system according to the exemplary embodiment of the present inventive concept.

FIG. 4 is a partial exploded perspective view of the motor and the pump unit in the urea solution pumping system according to the exemplary embodiment of the present inventive concept.

Referring to FIG. 4, the pump unit 115 includes the rotating shaft 200, the rotor over-molding 210, the exterior stator over-molding 225, a lower motor o-ring 400, a lower motor cover 405, a pump 410, a pump cover 415, a lower pump cover 420, an inlet 425, fastening bolts 430, and a housing 435.

The lower motor o-ring 400 is formed in a sealing structure between the stator outside molding 225 and the lower motor cover 405, and the pump 410 sucks an external urea solution through the inlet 425 of the lower pump cover 420 and pumps the sucked urea solution between the rotor 205 and the stator 215, so that the urea solution is pumped through the outlet 315. The pump 410 may be a gerotor.

The fastening bolts 430 are fastened to the exterior stator over-molding 225 while passing through the lower pump cover 420, the exterior stator over-molding 225 is inserted into the housing 435, and a leading end of the housing 435 is bent and fixed to the exterior stator over-molding 225.

FIG. 5 is a partial cross-sectional view of the pump unit, the motor, and the discharge unit according to the exemplary embodiment of the present inventive concept.

Referring to FIG. 5, the pump unit includes a pump unit 552 and a motor 554, and the pump unit 552 sucks a urea solution through the inlet 425 of the lower pump cover 420, while the pump 410 rotates by the rotating shaft 200 to pump the urea solution between the rotor 205 and the stator 215.

The motor 554 rotates the rotating shaft 200 and the pump 410 through a structure of the stator 215 and the rotor 205, and provides a urea solution flow gap between the rotor 205 and the stator 215.

The outlet 315 is formed at a part corresponding to the rotating shaft 200 at a center of the upper cover 300, and the outlet adaptor 1112 is integrally formed at a leading end of the upper cover 300.

A relief valve 500 relieving pressure to an upper side (a right side of FIG. 5) is disposed at an end of the outlet 315 in the outlet adaptor 1112, and a urea solution is discharged to a lower side (a left side of FIG. 5).

Figure 6:
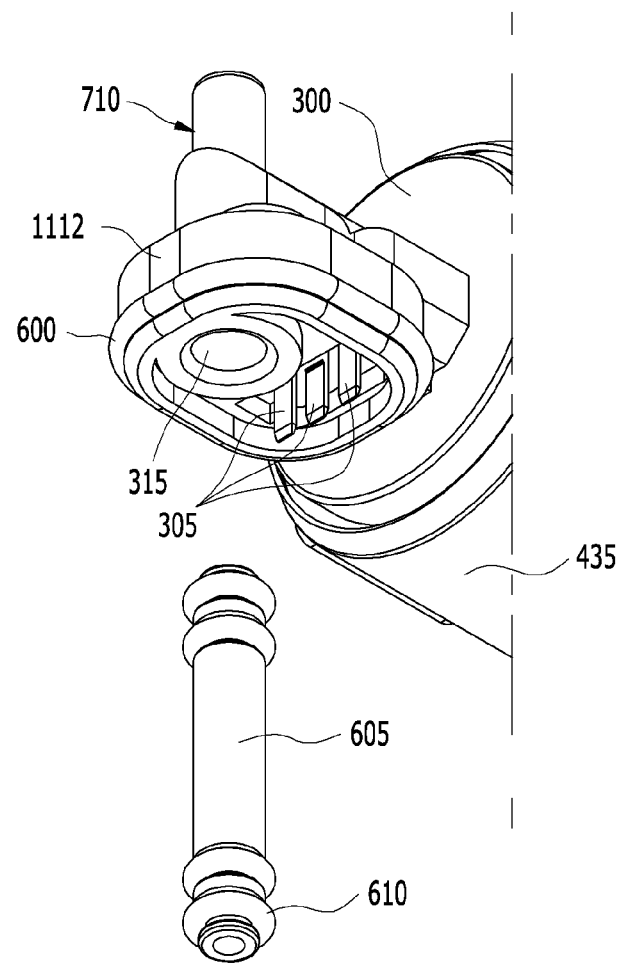
FIG. 6 is a partial exploded perspective view of the discharge unit according to the exemplary embodiment of the present inventive concept.

FIG. 6 is a partial exploded perspective view of the discharge unit according to the exemplary embodiment of the present inventive concept.

Referring to FIG. 6, an outlet adaptor 1112 having the outlet 315 opened to a lower side is integrally formed at a front side of the upper cover 300, and a relief pipe 710, in which the relief valve 500 is disposed, protrudes and is integrally formed on the upper cover 300.

A pipe-shaped metal port 605 is inserted into the outlet 315 formed at the lower side of the outlet adaptor 1112, a port o-ring 610 as a sealing member is mounted on an outer peripheral surface of the pipe-shaped metal port 605, and the three-phase terminal 305 connecting a power supply (not shown) to one side of the outlet 315 protrudes in a downward direction and is formed at a lower part of the outlet adaptor 1112.

Figure 7:
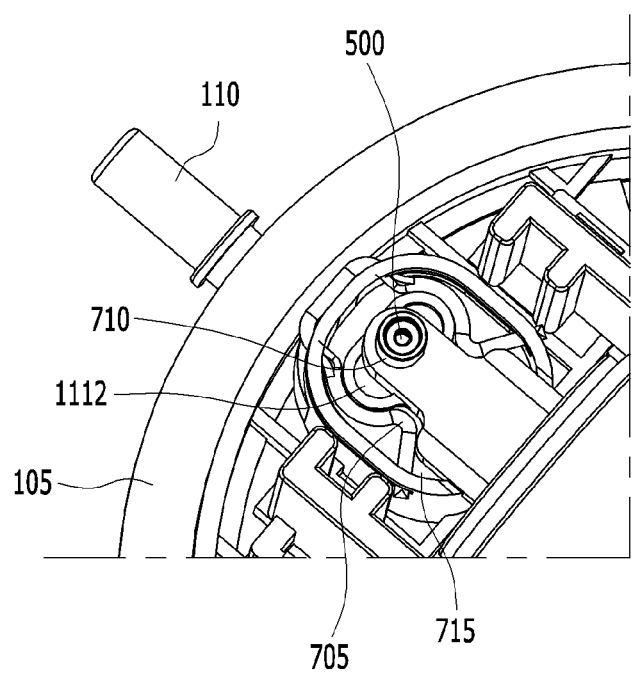
FIG. 7 is a partial perspective view illustrating a state in which a bracket is fastened to an adaptor part in the urea solution pumping system according to the exemplary embodiment of the present inventive concept.

A first adaptor o-ring 600 is disposed along a circumference at a lower side of an edge of the outlet adaptor 1112, and the first adaptor o-ring 600 forms a sealing structure with an internal surface of an adaptor insertion recess 715 of FIG. 7.

FIG. 7 is a partial perspective view illustrating a state in which the bracket is fastened to the adaptor part in the urea solution pumping system according to the exemplary embodiment of the present inventive concept.

Referring to FIG. 7, the adaptor insertion recess 715 is formed on an upper surface of the bracket 105, a lower part of the outlet adaptor 1112 is inserted into the adaptor insertion recess 715, and the clip 705 fixes the outlet adaptor 1112 to the adaptor insertion recess 715.

Further, the relief pipe 710 extends to an upper part of the outlet adaptor 1112, and the relief valve 500 is disposed at an internal side of the relief pipe 710.

Figure 8:
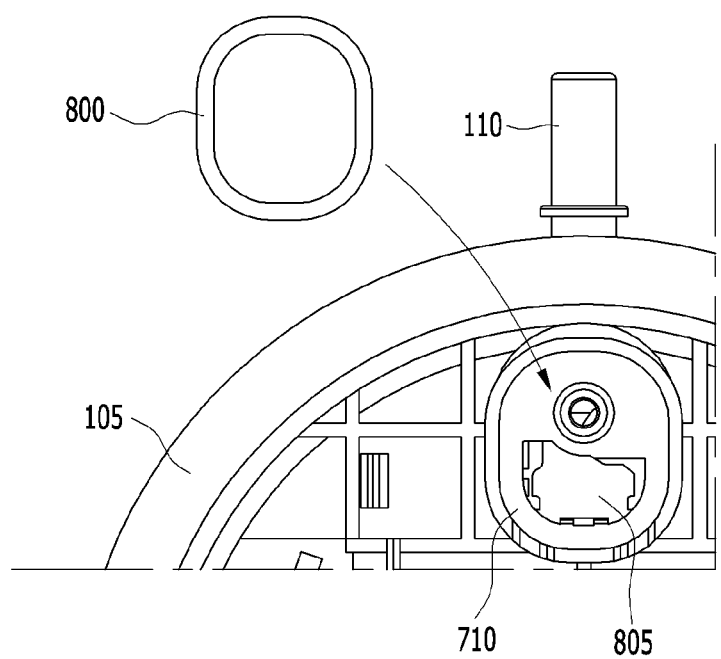
FIG. 8 is a partial exploded perspective view illustrating a part fastened to the adaptor on the bracket according to the exemplary embodiment of the present inventive concept.

FIG. 8 is a partial exploded perspective view illustrating a part fastened to the adaptor on the bracket according to the exemplary embodiment of the present inventive concept.

Referring to FIG. 8, a second adaptor o-ring 800 is in close contact with a bottom surface of the adaptor insertion recess 715, and the second adaptor o-ring 800 is in close contact with a lower surface of the outlet adaptor 1112 to form a sealing structure between the bracket 105 and the outlet adaptor 1112.

Further, a power connection hole 805 is formed on the bottom surface of the adaptor insertion recess 715 so that the three-phase terminal 305 protruding from the lower surface of the outlet adaptor 1112 is connected with the power supply.

Figure 9:
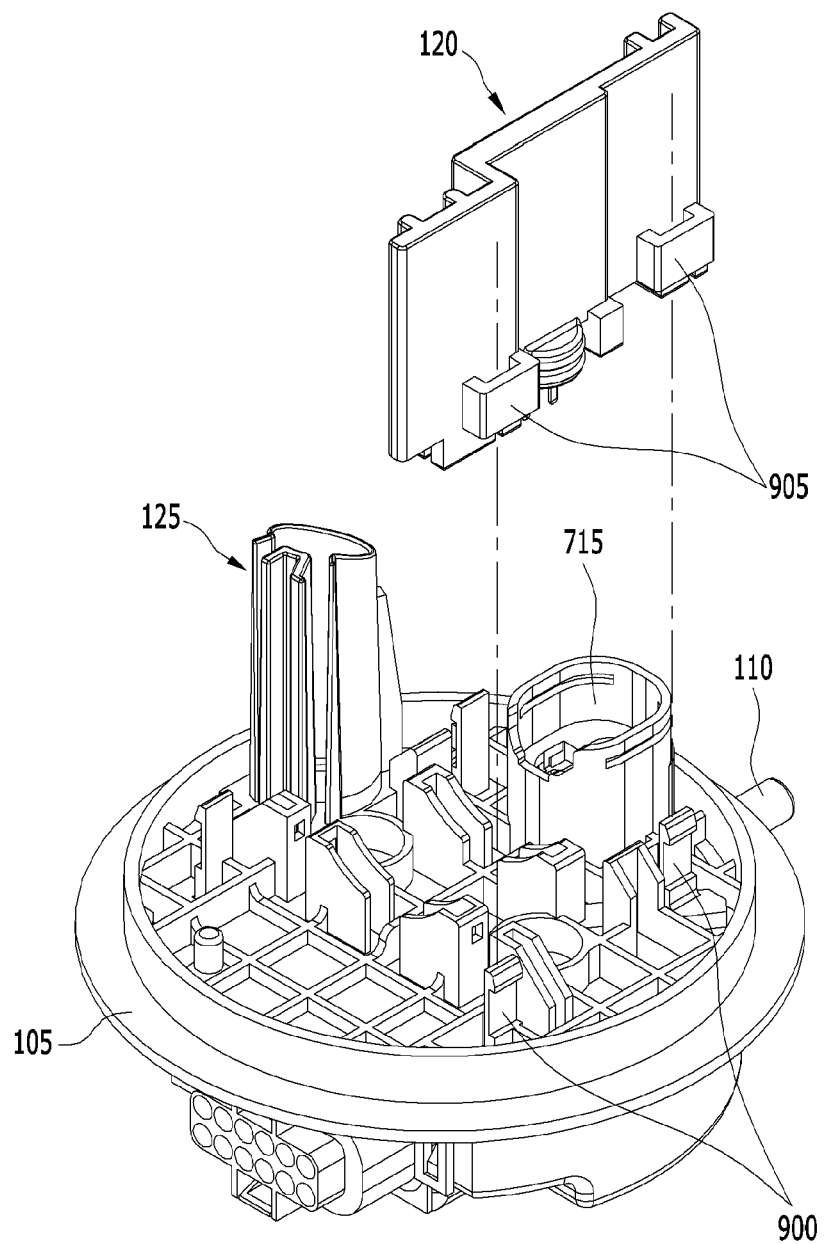
FIG. 9 is a partial exploded perspective view illustrating a fastening structure of the bracket and a thawing unit according to the exemplary embodiment of the present inventive concept.

FIG. 9 is a partial exploded perspective view illustrating a fastening structure of the bracket and the thawing unit according to the exemplary embodiment of the present inventive concept.

Referring to FIG. 9, the hooks 900 protrude and are integrally formed on the bracket 105, and the hook fastening parts 905, which are fastened to the hook 900 to be fixed, are integrally formed at a side lower portion of the thawing unit 120.

Figure 10:
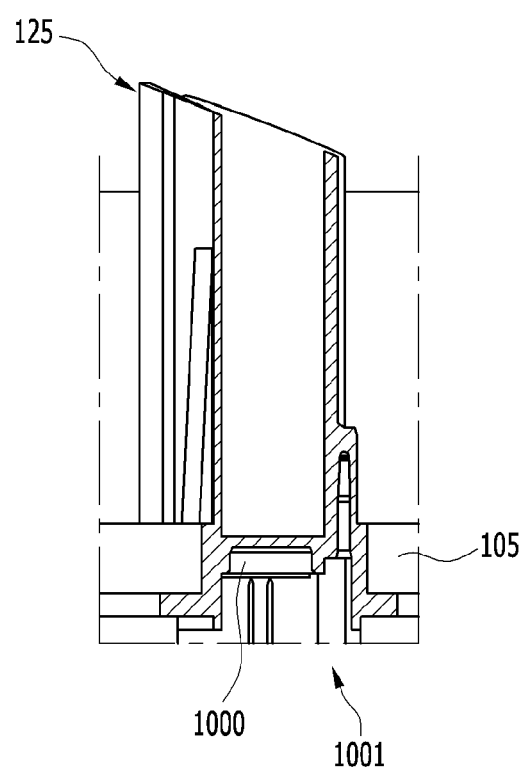
FIG. 10 is a partial cross-sectional view of the bracket according to the exemplary embodiment of the present inventive concept.

FIG. 10 is a partial cross-sectional view of the bracket according to the exemplary embodiment of the present inventive concept.

Referring to FIG. 10, a sensor unit 1001 is disposed on the bracket 105, the sensor unit 1001 includes a sensor cell 1000, and the sensor cell 1000 is covered by a sealant and the like, and foreign substances such as a urea solution are fundamentally prevented from flowing into the sensor cell 1000 by fixing the sensor cell 1000. The sensor unit 1001 may include a temperature sensor, a pressure sensor, or a level sensor.

Figure 11:
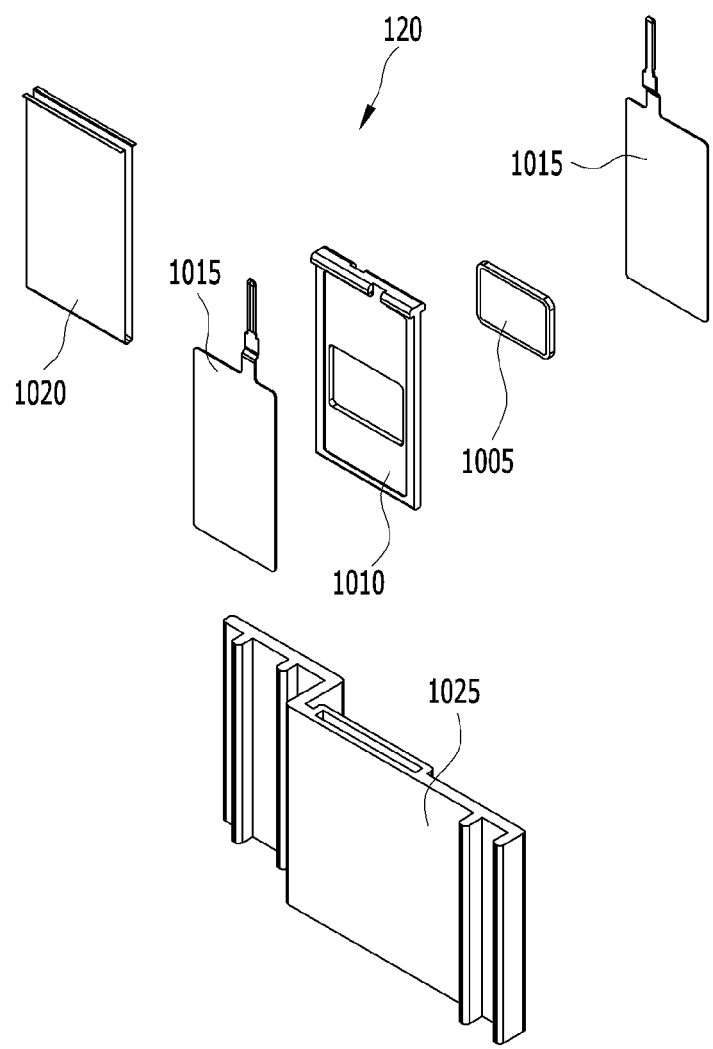
FIG. 11 is a partial exploded perspective view of the thawing unit according to the exemplary embodiment of the present inventive concept.

FIG. 11 is a partial exploded perspective view of the thawing unit according to the exemplary embodiment of the present inventive concept.

Referring to FIG. 11, the thawing unit 120 includes a positive temperature coefficient (PTC) thermistor 1005, a PTC guide 1010, power supply terminal plates 1015, a polyimide adhesive film 1020, and a thawing over-molding 1025.

A recess is formed at a center of the PTC guide 1010, the PTC thermistor 1005 is inserted into and disposed at the recess, and the power supply terminal plates 1015 are in close contact with both surfaces of the PTC guide 1010.

The polyimide adhesive film 1020 is attached to each of both external surfaces of the power supply terminal plate 1015, and the thawing over-molding 1025 is formed to completely surround an external side of the polyimide adhesive film 1020.

Figure 12:
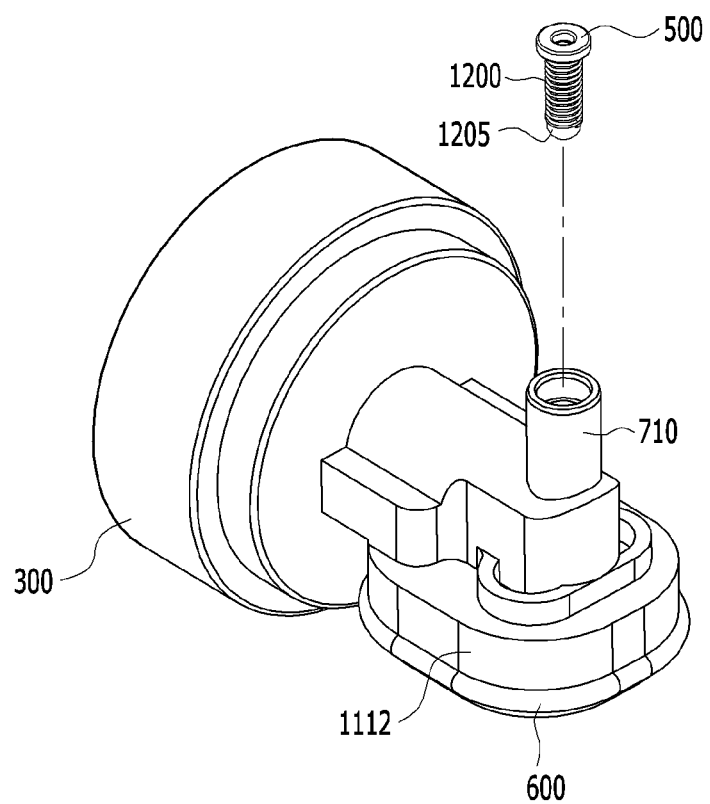
FIG. 12 is a partial exploded perspective view of the discharge unit according to the exemplary embodiment of the present inventive concept.

FIG. 12 is a partial exploded perspective view of the discharge unit according to the exemplary embodiment of the present inventive concept.

Referring to FIG. 12, the outlet adaptor 1112 protrudes and is integrally formed at the front side of the upper cover 300, the relief pipe 710 protrudes and is integrally formed at an upper side of the outlet adaptor 1112, and the relief valve 500 is disposed at an inner side of the relief valve 710.

As illustrated in FIG. 12, the relief valve 500 includes an elastic member 1200 and a check ball 1205, and when the elastic member 1200 elastically supports the check ball 1205 and a pressure of the urea solution pumped through the outlet 315 is equal to or larger than a predetermined value, the urea solution pushes the check ball 1205 and is relieved to the upper side of the outlet adaptor 1112.

Figure 13:
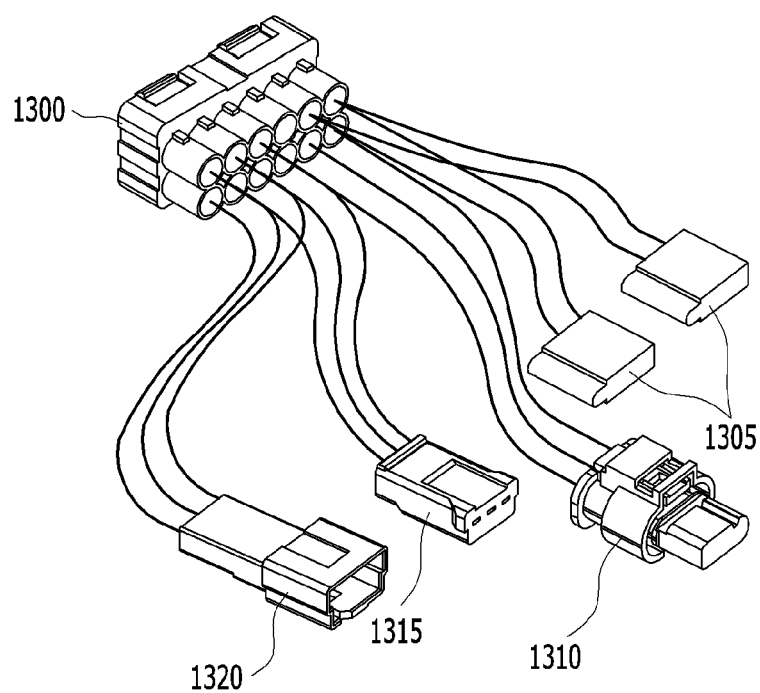
FIG. 13 is a partial exploded perspective view illustrating a structure of a connector in the urea solution pumping system according to the exemplary embodiment of the present inventive concept.

FIG. 13 is a partial exploded perspective view illustrating a structure of a connector in the urea solution pumping system according to the exemplary embodiment of the present inventive concept.

Referring to FIG. 13, a collective connector 1300 is fastened to a lower part of the bracket 105 to be connected to respective elements, and the collective connector 1300 is electrically connected with each of a heater connector 1305, a pressure sensor connector 1310, a motor connector 1315, and a level/temperature sensor connector 1320.

The heater connector 1305 is electrically connected with the PTC thermistor 1005 of the thawing unit 120, the pressure sensor connector 1310 is electrically connected with the pressure sensor, the motor connector 1315 is electrically connected with the rotor 205 or the stator 215, and the level/temperature sensor connector 1320 is electrically connected with the level sensor and the temperature sensor, respectively.

Accordingly, the urea solution pump unit according to the present disclosure may improve sealing performance and anti-corrosive performance by adopting the rotor molding and the stator molding formed by mixing engineering plastic and glass fiber.

Further, the o-ring for sealing is applied to each connection portion to prevent a urea solution from permeating into a power supply system. The metal port is applied to the inner side of the outlet, and thus it is possible to improve freezing stability and durability.

In the exemplary embodiment of the present inventive concept, the sensor unit includes a temperature sensor, a level sensor, or a pressure sensor, detailed structures of which are referred to in the publicly disclosed technology.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A urea solution pump unit, comprising:
 a bracket mounted to a lower side of a urea solution tank;
 a pump unit horizontally disposed at a center of an upper part of the bracket and including a pump suctioning a urea solution to one direction and a motor pumping the urea solution to another direction through a gap between a rotor and a stator of the motor inside the pump and discharging the urea solution to a lower side of the bracket;
 a pair of thawing brackets fixedly disposed at both sides of the pump unit on the bracket, the pair of thawing brackets transferring heat to the urea solution and preventing the urea solution from being frozen;
 a sensor disposed at one side of one of the thawing brackets and detecting a level, a temperature, and a pressure of the urea solution,
 wherein the motor includes a rotating shaft rotating together with the rotor so that the urea solution is sucked through one end of the rotating shaft and discharged to another end of the rotating shaft, and
 the pump unit includes:
  an upper cover disposed at the other end of the rotating shaft, having an outlet at a center thereof corresponding to the rotating shaft, and having a three-phase terminal which supplies power to the stator and is disposed at an external side of the outlet;
  an outlet adaptor integrally extending from the upper cover toward an opposite side of the rotor and fastened to an upper surface of the bracket to transfer the urea solution to the lower side of the bracket; and
  a relief valve fastened to the outlet adaptor and maintaining the urea solution at a predetermined pressure or lower.

2. The urea solution pump unit of claim 1, wherein the stator includes:
 an exterior stator over-molding surrounding an outer peripheral surface of the stator; and
 an interior stator over-molding surrounding an inner peripheral surface of the stator.

3. The urea solution pump unit of claim 2, wherein the rotor includes:
 a rotor over-molding surrounding an outer side of the rotor.

4. The urea solution pump unit of claim 1, wherein
 when the relief valve is connected with the outlet and a pressure equal to or larger than the predetermined pressure is detected, the relief valve autonomously opens and relieves the pressure to an upper side of the bracket.

5. The urea solution pump unit of claim 1, wherein
the three-phase terminal extends to a lower part of the outlet adaptor and communicates with outside through the bracket.

6. The urea solution pump unit of claim 5, further comprising:
a first adaptor o-ring disposed around the three-phase terminal, which extends to lower sides of the outlet and the outlet adaptor, to seal the outlet and the outlet adaptor from the urea solution in which the outlet extends at a lower side of the outlet adaptor.

7. The urea solution pump unit of claim 1, wherein
a pipe-shaped metal port is inserted into an internal peripheral surface of the outlet corresponding to the outlet adaptor, and
one or more port o-rings, which are sealing members, are disposed on an outer peripheral surface of the pipe-shaped metal port.

8. The urea solution pump unit of claim 1, wherein
a discharge pipe discharges the urea solution received from the outlet adaptor and integrally extends at the lower side of the bracket,
a pipe-shaped metal port is inserted in an internal peripheral surface of the outlet, and
one or more port o-rings, which are sealing members, are disposed on an outer peripheral surface of the pipe-shaped metal port.

9. The urea solution pump unit of claim 1, wherein
an adaptor insertion recess, into which the outlet adaptor is inserted, is formed on the bracket, and
the urea solution pump unit includes a clip that fixes the outlet adaptor to the adaptor insertion recess in a state where the outlet adaptor is inserted into the adaptor insertion recess.

10. The urea solution pump unit of claim 9, further comprising:
a second adaptor o-ring disposed between a lower surface of the outlet adaptor and a bottom surface of the adaptor insertion recess to seal a urea solution.

11. The urea solution pump unit of claim 1, wherein the bracket includes:
hooks integrally formed on the bracket; and
hook fastening parts fastened to the hooks and integrally formed at a lower side of each thawing bracket.

12. The urea solution pump unit of claim 1, wherein the sensor includes:
a sensor flange extending to an upper side of the bracket; and
a sensor cell mounted on the bracket at a lower end of the sensor flange,
wherein the sensor cell is surrounded by a resin material to be sealed from the urea solution, is fixed to the bracket, and is electrically connected to a lower external side of the bracket.

13. The urea solution pump unit of claim 1, wherein each of the pair of thawing brackets includes:
a positive temperature coefficient (PTC) thermistor configured to generate heat by electrical energy;
a PTC guide having a recess into which the PTC thermistor is mounted;
a pair of power supply terminals attached to both surfaces of the PTC guide and in contact with the PTC thermistor;
an adhesive film attached to external surfaces of the pair of power supply terminals; and
a thawing over-molding surrounding external sides of the PTC thermistor, the PTC guide, and the adhesive film to protect the PTC thermistor, the PTC guide, and the adhesive film from the urea solution.

14. The urea solution pump unit of claim 1, wherein
the relief valve includes a check ball and an elastic member elastically supporting the check ball.

15. The urea solution pump unit of claim 1, further comprising:
a heater connector connecting a power supply to the pair of thawing brackets;
a pressure sensor connector connecting the power supply to the sensor;
a motor connector connecting the power supply to the motor;
a level/temperature sensor connector connecting the power supply to the sensor; and
a collective connector mounted at the lower side of the bracket and connected to each of the heater connector, the pressure sensor connector, the motor connector, and the level/temperature sensor connector at one side of the collective connector.

16. The urea solution pump unit of claim 1, wherein the sensor includes a temperature sensor, a pressure sensor, or a level sensor.

* * * * *